(12) United States Patent
Huang

(10) Patent No.: US 8,376,552 B2
(45) Date of Patent: Feb. 19, 2013

(54) COLOR WHEEL MODULE FOR PROJECTOR

(75) Inventor: Yung-Lun Huang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 155 days.

(21) Appl. No.: 13/092,979

(22) Filed: Apr. 25, 2011

(65) Prior Publication Data

US 2012/0170006 A1 Jul. 5, 2012

(30) Foreign Application Priority Data

Dec. 29, 2010 (TW) ................................ 99146457 A

(51) Int. Cl.
*G03B 21/14* (2006.01)

(52) U.S. Cl. ............. 353/84; 353/31; 348/743; 359/892
(58) Field of Classification Search .................... 353/31, 353/34, 37, 84; 359/891, 892; 348/742, 348/743, 771
See application file for complete search history.

(56) References Cited

U.S. PATENT DOCUMENTS

| 7,530,697 B2* | 5/2009 | Sawai et al. ..................... 353/94 |
| 2006/0164606 A1* | 7/2006 | Bhowmik ....................... 353/84 |
| 2007/0121231 A1* | 5/2007 | Pao ............................... 359/892 |
| 2008/0143977 A1* | 6/2008 | Hewlett et al. ................... 353/84 |
| 2009/0244494 A1* | 10/2009 | Wada et al. ...................... 353/84 |
| 2010/0283977 A1* | 11/2010 | Wang et al. ...................... 353/84 |

* cited by examiner

*Primary Examiner* — William C Dowling
(74) *Attorney, Agent, or Firm* — Altis Law Group, Inc.

(57) ABSTRACT

A color wheel module includes a color disc having a plurality color filter segments, a liquid crystal ring, and a controller. Each border is defined between each two adjacent color filter segments, the borders comprising a reference border. The liquid crystal ring is positioned on the color disc to cover the color filter segments. The controller is connected to the liquid crystal ring. The controller includes a synchronizing module and a shading module. The synchronizing module obtains an central angle of the color disc between a light path perpendicularly radiating on the color disc and the border on the reference border. The shading module obtains the central angle. When the central angle is less than a preset angle, the shading module controls the liquid crystal ring to block light from passing through. Otherwise, the liquid crystal ring is controlled to allow light to pass through the color filter segments.

11 Claims, 3 Drawing Sheets

COLOR WHEEL MODULE FOR PROJECTOR

BACKGROUND

1. Technical Field

The present disclosure relates to a color wheel module for a projector.

2. Description of Related Art

A Digital Light Processing (DLP) projector for producing color images on a screen comprises one image panel: sequentially illuminated with light beams of different colors in order to form a colored image. One method to realize the required sequential illumination is to place color filter segments that are secured on a rotatable hub in the path of a light beam. However, the size of the spot of the light beam is greater than the width of the border between the adjacent color filter segments. The projector projects a light beam having two different colors, when the border is illuminated by the light beam. Thus, some viewers will see red, blue, or green "shadows".

What is needed, therefore, is a color wheel module to overcome the described limitations.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments.

DETAILED DESCRIPTION

Embodiments of the present disclosure will now be described in detail below, with reference to the accompanying drawings.

Figure 1:
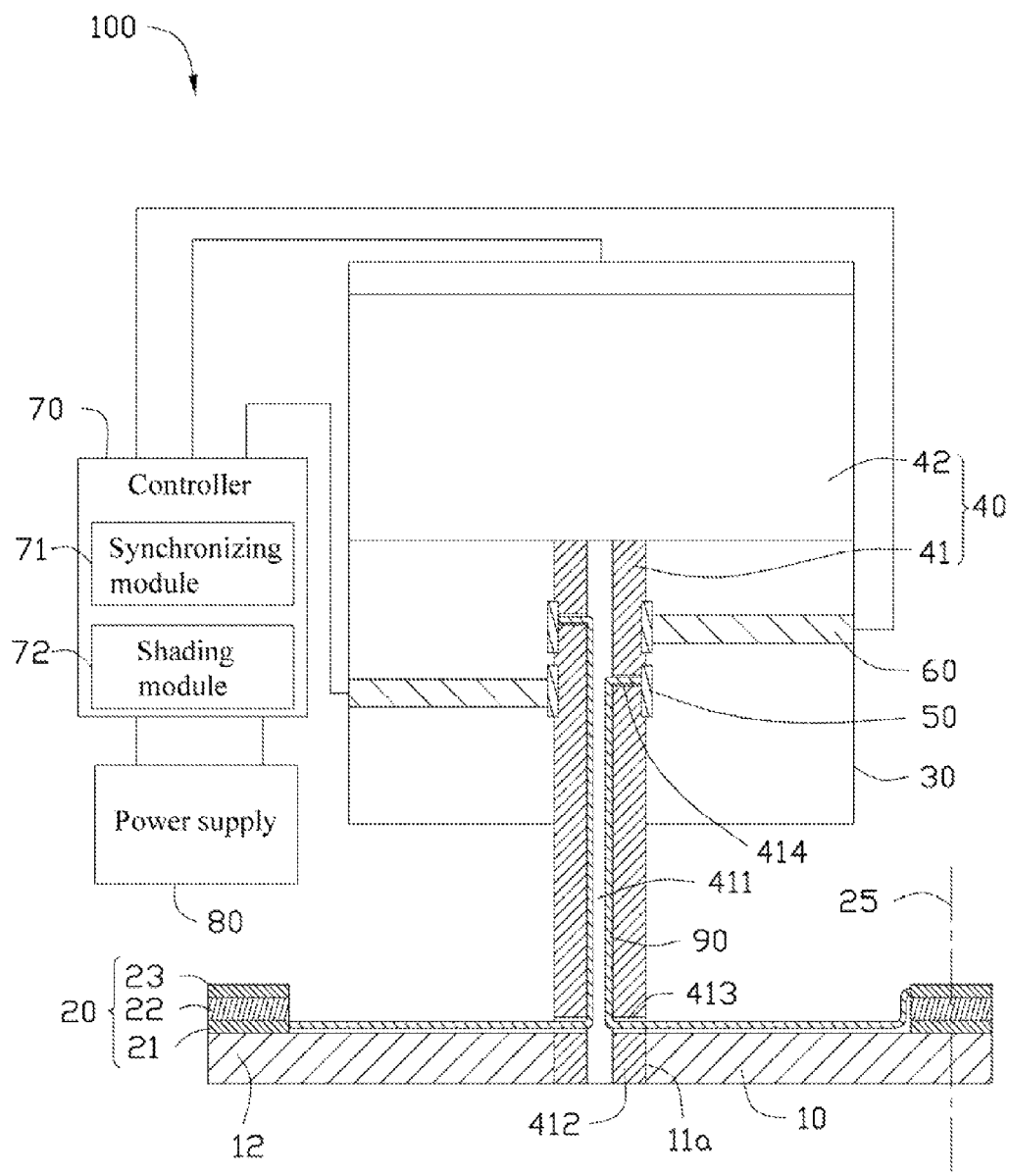
FIG. 1 is a schematic view of a color wheel module according to an exemplary embodiment, the color wheel module including a liquid crystal ring and a color disc.
Figure 2:
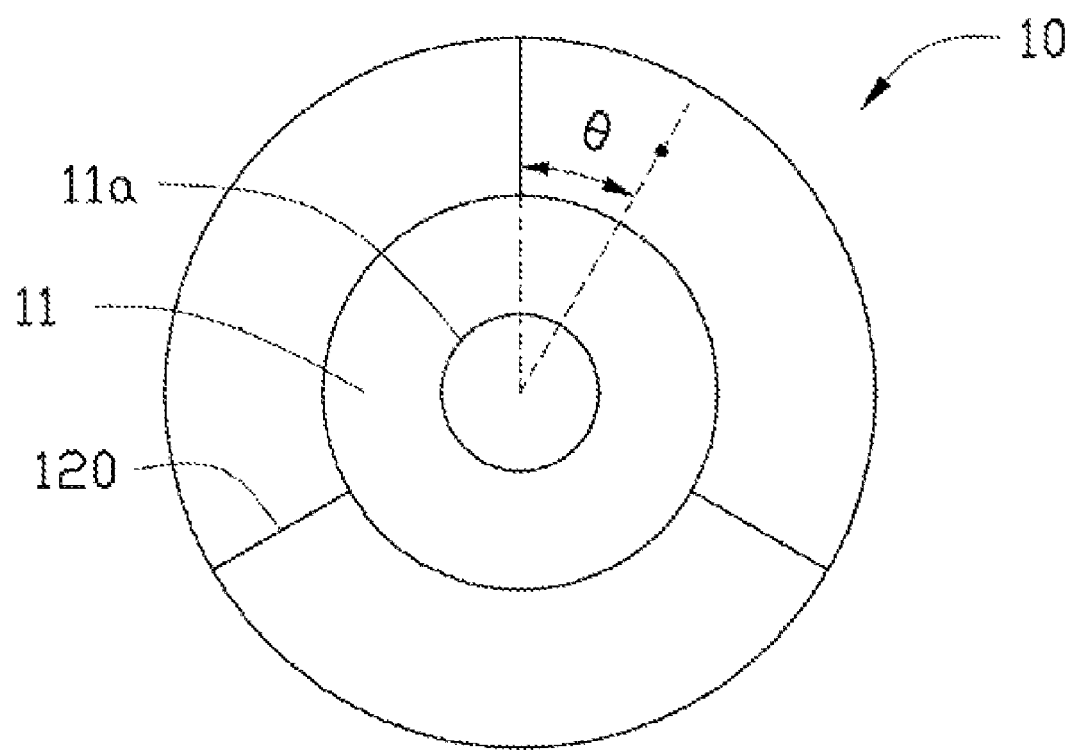
FIG. 2 is a schematic view of the color disc.
Figure 3:
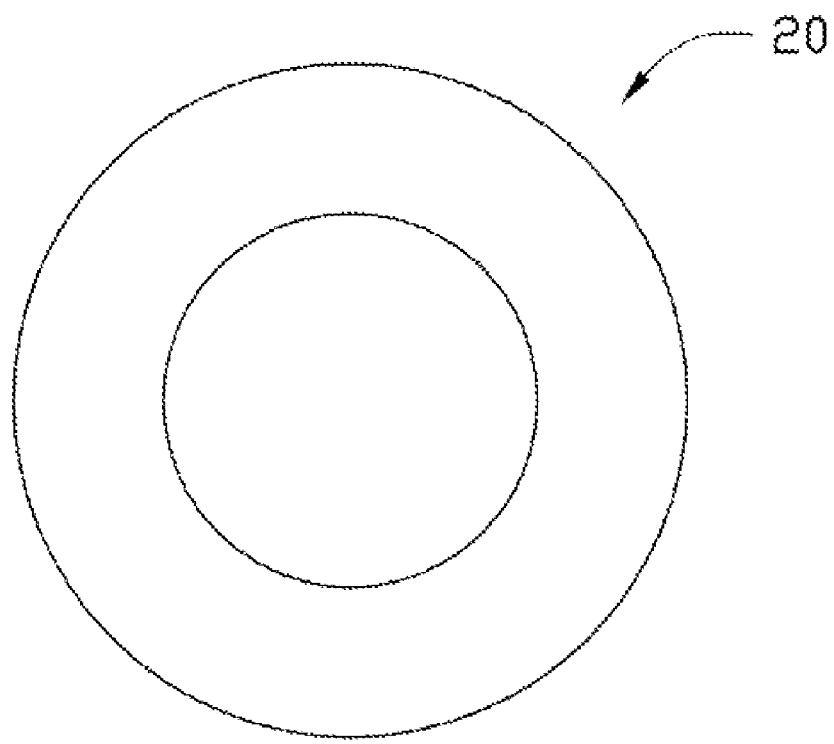
FIG. 3 is a schematic view of the liquid crystal ring.

Referring to FIGS. 1, 2 and 3, a color wheel module 100, according to an exemplary embodiment is shown. The color wheel module 100 includes a color disc 10, a liquid crystal ring 20, a holder 30, a motor 40, two slip rings 50, two slip ring brushes 60, a controller 70, and a power supply 80.

The liquid crystal ring 20 is fixed on the color disc 10. The color disc 10 is rotatably mounted to the motor 40. The motor 40 is fixed on the holder 30. The controller 70 is electrically connected between the power supply 80 and the two slip ring brushes 60 to control the voltage applied on the liquid crystal ring 20.

The color disc 10 includes a holding portion 11 and three different colored filter segments 12 radially and evenly arranged around the holding portion 11. The color disc 10 includes three borders 120, with each border 120 located between each two adjacent color filter segments 12. One of the three borders 120 is regarded as the reference border. The holding portion 11 defines a central hole 11a. The liquid crystal ring 20 covers the three color filter segments 12, exposing the holding portion 11. In the present embodiment, the liquid crystal ring 20 is attached on a disc surface of the color disc 10. The liquid crystal ring 20 includes a first ring electrode 21, a liquid crystal panel 22, and a second ring electrode 23. The liquid crystal panel 22 is glued between the first ring electrode 21 and the second ring electrode 23. The first ring electrode 21 is glued on the three color filter segments 12. The first ring electrode 21 and the second ring electrode 23 are transparent. In the present embodiment, the first ring electrode 21 and the second ring electrode 23 are Indium tin oxide (ITO) electrodes. The electric field between the first ring electrode 21 and the second ring electrode 23 is applied to change the orientation of the liquid crystal molecules in the liquid crystal panel 22. The electric field between the first ring electrode 21 and the second ring electrode 23 is changed to block light from passing the three color filter segments 12 or to allow light to pass the three color filter segments 12.

The holder 30 is fixed in a projector (not shown). In the present embodiment, the holder 30 is a cylindrical structure. The motor 40 includes a rotor 41 and a main body 42. The main body 42 is fixed on the inner surface of the holder 30. The rotor 41 is a hollow shaft made of insulation material. The rotor 41 defines an interior cavity 411 extending through the rotor 41. The color disc 10 is sleeved on a tail end 412 of the rotor 41 by the central hole 11a of the color disc 10. The color disc 10 is fixed on the tail end 412 of the rotor 41 with glue. The tail end 412 defines two inlet openings 413 opposite to each other. Two outlet openings 414 are defined in a portion of the rotor 41 adjacent to the main body 42. The two outlet openings 414 are arrayed along axial directions of the rotor 41. Two leads 90 pass through the interior cavity 411 of the rotor 41 from the corresponding inlet openings 413 to the corresponding outlet openings 414. The two slip rings 50 are fixed on the rotor 41 corresponding to the two outlet openings 414 with glue. The two slip rings 50 are electrically connected the first ring electrode 21 and the second ring electrode 23 respectively by the leads 90.

The two slip ring brushes 60 are fixed in the holder 30 corresponding to the two slip rings 50. The two slip ring brushes 60 are electrically connected with the two slip rings 50 respectively.

The motor 40 and the liquid crystal ring 20 are both electrically connected to the controller 70. In the present embodiment, the controller 70 is electrically connected to the two slip ring brushes 60. The controller 70 includes a synchronizing module 71 and a shading module 72. The synchronizing module 71 obtains a central angle θ of the color disc 10 between a light path 25 perpendicularly radiating on the color disc 10 and the reference border 120. The synchronizing module 71 controls rotation of a DMD chip of the projector to synchronize with the position of the color filter segments 12 relative to the light path 25. Thus, the color component is projected to the DMD chip when the corresponding color filter segment 12 is applied in the light path 25. In the present embodiment, the time-sharing technology is applied on the synchronizing module 71. Specifically, the synchronizing module 71 obtains a rotation angle of the motor 40 relative to a pre-set reference position by a counter (not shown). Then, the synchronizing module 71 calculates the central angle θ to determine which color filter segment 12 is at the light path 25. The synchronizing module 71 controls rotation of the DMD chip corresponding to the calculated color filter segment 12 at the light path 25.

The shading module 72 obtains the central angle θ. The shading module 72 controls the liquid crystal ring 20 to block light from passing through the liquid crystal ring 20, when the central angle θ is less than a preset angle. Otherwise, the shading module 72 controls the liquid crystal ring 20 to pass light from the liquid crystal ring 20. In the present embodiment, the preset angle is 2 degrees. The controller 70 controls the power supply 80 to apply an electric field on the liquid crystal ring 20 to block light from passing through the liquid crystal ring 20, when the central angle θ is less than 2 degrees.

The controller 70 controls the power supply 80 to apply an electric field on the liquid crystal ring 20 to allow light to pass through the liquid crystal ring 20, when the central angle θ is greater than or equal to 2 degrees. The shading module 72 can block the light with two colors when the spot of the light beam projects on the border 120.

While certain embodiments have been described and exemplified above, various other embodiments will be apparent to those skilled in the art from the foregoing disclosure. The present disclosure is not limited to the particular embodiments described and exemplified, and the embodiments are capable of considerable variation and modification without departure from the scope of the appended claims.

What is claimed is:

1. A color wheel module, comprising:
   a color disc comprising a plurality color filter segments and a plurality of borders, each border being defined between each two adjacent color filter segments, the borders comprising a reference border;
   a liquid crystal ring positioned on the color disc to cover the plurality of color filter segments; and
   a controller electrically connected to the liquid crystal ring, the controller comprising:
   a synchronizing module configured for obtaining a central angle of the color disc between a light path perpendicularly radiating on the color disc and the reference border;
   a shading module configured for obtaining the central angle, wherein when the central angle is less than a pre-set angle, the shading module controls the liquid crystal ring to block all light from passing through the color filter segments, when the central angle is greater than or equal to the pre-set angle, the shading module controls the liquid crystal ring to allow all light to pass through the color filter segments.

2. The color wheel module as claimed in claim 1, wherein the liquid crystal ring is a hollow circular ring.

3. The color wheel module as claimed in claim 1, wherein the liquid crystal ring comprises a first ring electrode, a liquid crystal panel, and a second ring electrode, the liquid crystal panel is positioned between the first ring electrode and the second ring electrode, the first ring electrode and the second ring electrode are transparent, the controller is electrically connected to the first and second ring electrodes.

4. The color wheel module as claimed in claim 3, wherein the first ring electrode and the second ring electrode are indium tin oxide electrode.

5. The color wheel module as claimed in claim 1, wherein the pre-set angle is 2 degrees.

6. The color wheel module as claimed in claim 1, further comprising a motor connected to the color disc and configured for driving the color disc.

7. The color wheel module as claimed in claim 6, wherein the motor comprise a rotor and a main body, the color disc is fixed on a tail end of the rotor, the wheel module further comprise two slip rings and two slip ring brushes, the two slip rings are fixed on the rotor, the two slip rings are electrically connected to the liquid crystal ring, the two slip ring brushes are fixed on the main body and connected to the two slip rings respectively, the two slip ring brushes are electrically connected to the controller.

8. The color wheel module as claimed in claim 7, wherein the rotor is a hollow shaft made of insulation material.

9. The color wheel module as claimed in claim 8, wherein the rotor defines an interior cavity passing through the rotor.

10. The color wheel module as claimed in claim 9, wherein the rotor defines two inlet openings in the tail end, and two outlet openings close to the main body, the two outlet opening are arrayed along axial directions of the rotor, the color wheel module comprises two leads, each lead passes through a corresponding inlet opening, the interior cavity, and a corresponding outlet opening, the two slip rings are fixed on the rotor corresponding to the two outlet openings, the two slip rings are electrically connected to the liquid crystal ring by the leads.

11. The color wheel module as claimed in claim 7, wherein the color disc defines a central hole, the color disc is sleeved on the tail end of the rotor by the central hole.

* * * * *